R. A. ANDERSON.
WATER METER.
APPLICATION FILED DEC. 3, 1919.

1,411,258.

Patented Apr. 4, 1922.

WITNESS:
F. Noll.
Edward J. Gies.

INVENTOR
Robert A. Anderson,
BY
Fredk C. Fischer.
ATTORNEY

UNITED STATES PATENT OFFICE.

ROBERT A. ANDERSON, OF CALDWELL, NEW JERSEY, ASSIGNOR TO GAMON METER COMPANY, OF NEWARK, NEW JERSEY, A CORPORATION OF NEW JERSEY.

WATER METER.

1,411,258.  Specification of Letters Patent.  Patented Apr. 4, 1922.

Application filed December 3, 1919. Serial No. 342,044.

*To all whom it may concern:*

Be it known that I, ROBERT A. ANDERSON, a citizen of the United States, residing in the borough of Caldwell, county of Essex, and State of New Jersey, have invented certain new and useful Improvements in Water Meters, of which the following is a full, clear, and exact description, such as will enable others skilled in the art to which it pertains to make, construct, and use the same, reference being had to the accompanying drawings, and to numerals of reference marked thereon, forming a part of this specification.

This invention relates to water meters and the object of my invention is to so construct an apparatus for measuring the flow of water or other liquids that it will register with equal accuracy widely differing rates of flow, that is, small flows and large flows, or in other words, works equally well under the widely different conditions, where the apparatus has to do "low-duty" or "high-duty". This object I attain by constructing what may be called a compound meter, wherein a plurality of metering devices, whether of the same general construction or of different constructions, are adapted, one for relative high-duty and another for relatively low-duty, and are combined with means whereby the varying pressure differential will itself determine the appropriate metering device through which the flow shall pass and will shut it off for the time being from the other metering device.

It is, of course, the primary object in meters of this character to provide devices whereby the change from high-duty conditions to low-duty conditions is made without loss of accuracy in the registration of the metering devices.

At the present time, compound meters in actual use and from tests made disclosed under-registration in actual service, due to the employment of gradually opening regulating valve, which instead of opening abruptly, opens gradually thereby providing a floating or pulsating valve with its well recognized disadvantages.

The primary object of my invention is to overcome these objections, which I accomplish by providing compound meters with an abruptly opening and closing regulating valve, as distinguished from a gradually opening or a floating or pulsating regulating valve, so designed as to open or close abruptly with either simultaneous closing or opening of the by-pass or with a sufficient reduction of pressure loss to materially relieve the by-pass meter and deflect the bulk of its flow through the main line, thereby setting up a flow through the main line sufficient for accurate registration on the large meter.

My invention may be carried into effect in various ways, and, by the employment of various types and constructions of metering devices, and is not limited to any details of construction or arrangement of the essential elements enumerated in the claims.

I prefer to mount the several metering devices in one casing, and in the accompanying drawings, I have shown the preferred form of my invention, in which the casing containing the metering devices is provided with a common inflow and a common overflow.

The invention is fully illustrated in the accompanying drawings, in which—

Similar numerals of reference indicate corresponding parts throughout the specification and drawings.

Figure 1:
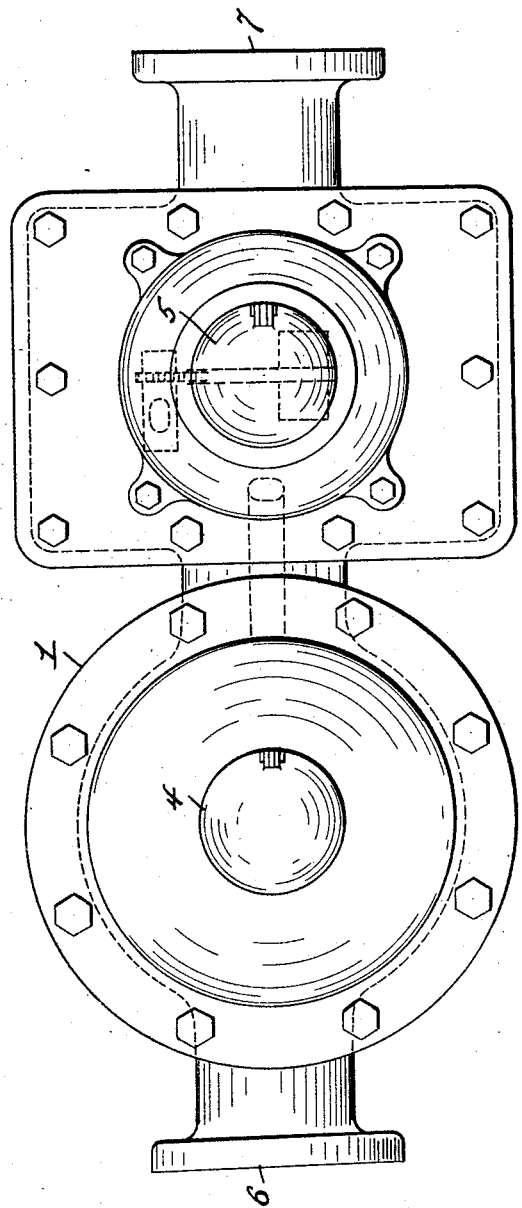
Figure 1 represents, a plan view of a compound meter, embodying my invention.

Referring to the drawings I have shown within one and the same casing 1 two metering devices 2 and 3 with their respective registering mechanisms at 4 and 5.

In the present instant, the meter 2 is of the turbine type and adapted for relatively "high-duty work", that is, to register accurately large flows of liquid.

The meter 3 is of the mutating piston type, and adapted for relatively "low-duty work", that is, to register accurately small flows of liquid.

There is a common inlet or inflow opening at 6 for the two meters, and a common outlet or outflow at 7.

The inlet 6 opens into a chamber 8 from which the incoming liquid may enter the turbine meter 2 above and below the usual turbine wheels, as is common, and then pass out from the space between the wheels into a conduit 10 and into the chamber 11 leading to the outlet 7, provided the valve 12 at the end of said conduit 10 is open.

The incoming flow of liquid has access to the "low-duty" meter 3 from the chamber 8, through a conduit 13, and after passing through this meter, it can flow through the valve 14 into the outlet chamber 11 and outlet 7 provided the valve 14 is in the open position shown in the drawing.

These two valves 12 and 14 thus controlling the outlet conduits or passages from the respective meters and therefore controlling the flows through the two branches containing the two meters are connected to work together so that when one valve is opened the other is positively and abruptly moved to the closed position and vice versa, thereby positively preventing the heretofore common floating or pulsating movement of the regulating valve.

Figure 2:
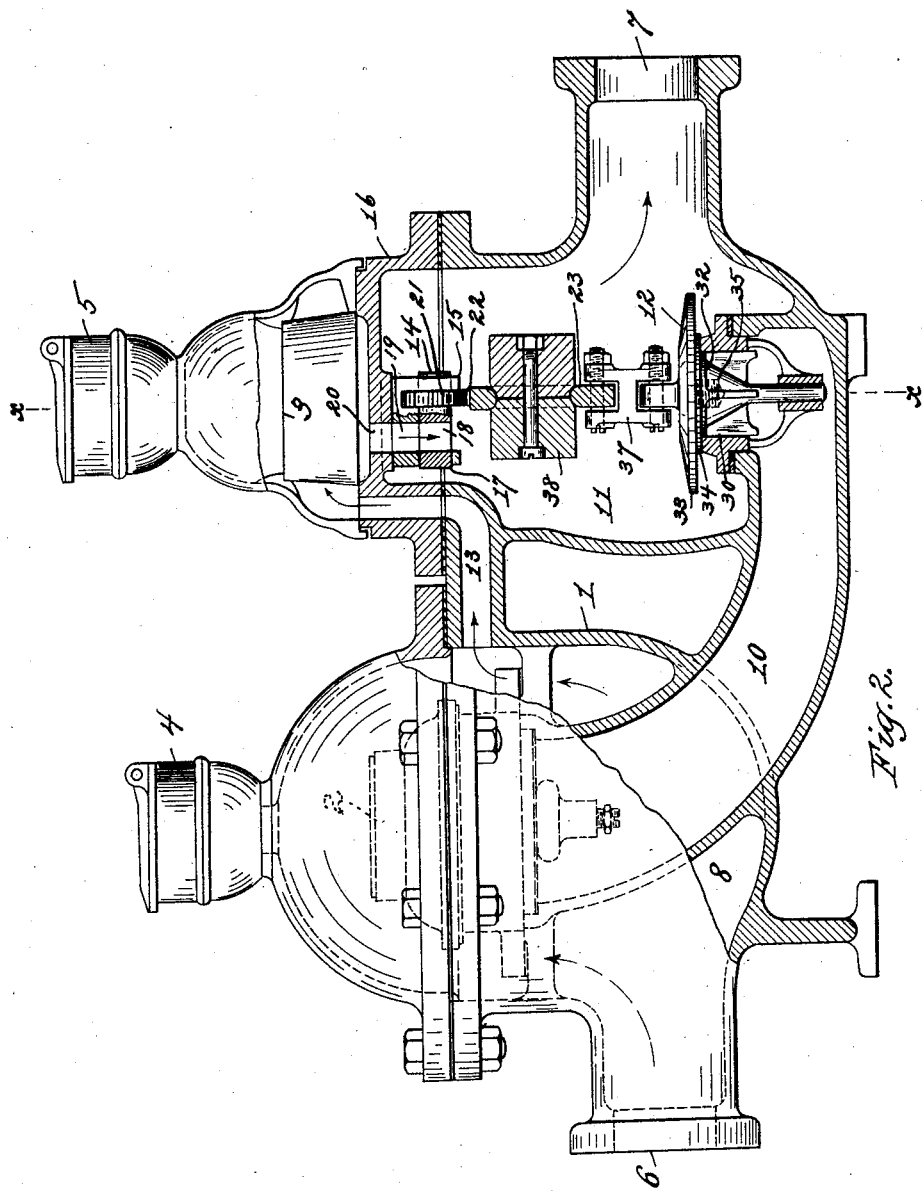
Figure 2 represents, a side elevation, the main part of the apparatus being shown in vertical section, but with the registering tops in elevation.

For this purpose, in the construction shown in Figure 2, the valve 14, which is indicated as a rotary valve is operatively connected to the back of the valve 12 which is illustrated as a weighted valve, so that when the flow of water is small, as during normal operation of the meter the "low-duty" meter 3 is in operation, the difference of pressure between the inlet and outlet is insufficient to raise the weighted valve 12 from its seat, and so long as that condition continues the liquid will only flow through the "low-duty" meter 3 and will be registered accurately through that meter, which when the pressure differential increases sufficiently, as in the case of use during a fire, to raise the valve 12 the valve 14 will thereby be simultaneously closed, and the "high-duty" meter 2 will come into operation alone, and the large flow will thus be registered accurately by that meter 2.

The valve 14 may be suspended from a supporting bracket 15 secured to the under side of the cover 16 and consists of a rod 17 provided with an elongated opening 18 which registers with a corresponding opening 19 in the supporting bracket 15, the said opening 19 registering with a corresponding opening 20 in the cover 16 which registers with the meter 3.

Rigidly mounted upon the rod 17, in any desired or convenient manner and rotating therewith, is a pinion 21 designed to engage with the toothed rack 22, which preferably forms an integral part of the pivoted yoke 23, which is pivoted at 24 and carried by the arm 25 of the supporting bracket 26.

The supporting bracket 26 is secured upon a suitable integral boss 27 formed upon the interior of the outlet chamber 11 by means of the stud 28 and the screw 29.

Figure 3:
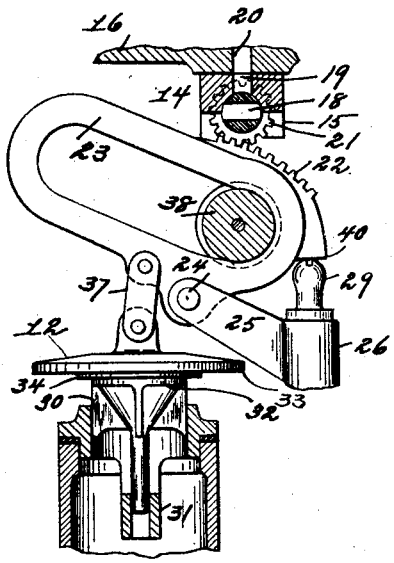
Figures 3 and 4 represent, fragmentary vertical sections, taken on line $x$—$x$ in Figure 2, showing the open and closed positions of the high and low-duty valves.
Figure 5:
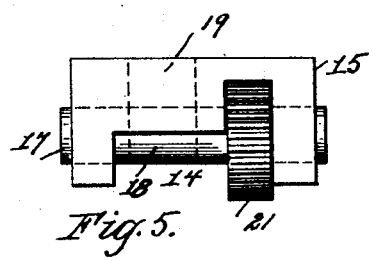
Figures 5 and 6 represent, respectively, a plan and side elevation of the low-duty rotary valve.
Figure 6:
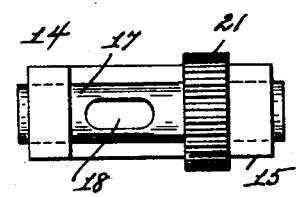

The toothed rack 22 is provided with an integral extension or stop 40 designed to engage with the head of the screw 29, see Figure 3 of the drawings, to limit the movement of said yoke in one direction.

One end of the conduit 10 is provided with a valve seat 30 upon which is seated the weighted valve 12. This valve consists of two members numbered respectively 32 and 33, the member 32 comprising a cylindrical portion provided with a centrally arranged screw threaded aperture in the top thereof, and a stem projecting from the bottom thereof intended to be received into and guided by a tubular bearing 31 formed integral with the valve seat 30. The upper cylindrical portion of the member 32 being designed to fit the interior of the valve seat. The member 33 of the valve consists of a disk, the area of which for practical purposes is approximately six times as great as the area of the cylindrical portion of the member 32, and which overlaps the valve seat 30 to a considerable extent. These two members have interposed between them a rubber gasket 34 and are secured together by means of the screw threaded stem or stud 35 located on the under side of the member 33, and which is received into and has screw threaded engagement with the screw threaded aperture in the member 32.

An integral stud or lug 36 is located on the top of the disk 33 to which one end of a link 37 is pivoted, the other end of said link being pivoted to the yoke 23.

Figure 4:
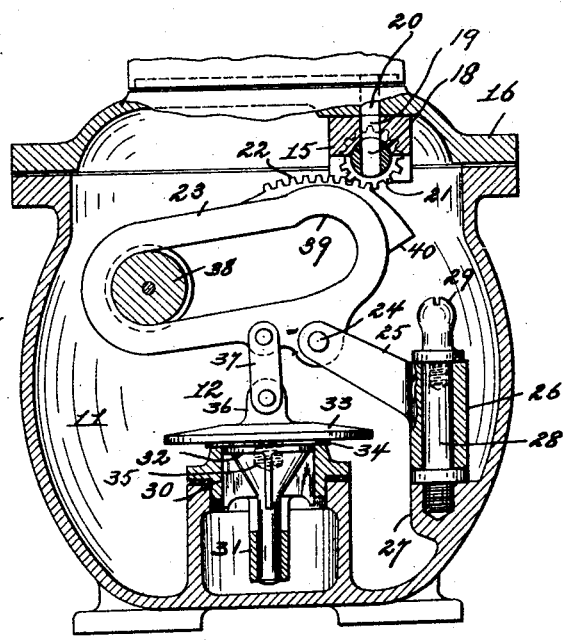

A counter weight 38 is operatively carried by the pivoted yoke 23, and when said weighted valve 12 is in its closed position, the counter weight 38 is in the position indicated in Figure 4 of the drawings, and when the weighted valve 12 is in its open position as indicated in Figure 3 of the drawings, the counter weight is in the position indicated in said figure.

It will thus be seen that any excessive difference of pressure above and below the valve of water passing through the conduit 10, exerted on the under side of the member 32 of the valve 12 will raise the valve 12 from its seat 30. The slightest movement in an upward direction of the valve 12 will cause the counter weight 38 to roll into and be retained by the portion 39 of the yoke 23, thereby abruptly and completely opening the valve 12 to its maximum capacity, and closing the valve 14. So long as the excessive pressure is exerted on the under side of the valve 12 the weight will remain in the position indicated in Figure 3 of the drawings. The moment that the water pressure is decreased, said decreased pressure will exert itself upon the upper side of the large disk 33 which will immediately move downward and instantly cause the counter weight to assume the position indicated in Figure 4 of the drawings, thereby abruptly closing the valve 12 and opening the valve 14.

Experience has demonstrated that the organization above described is a highly efficient one, and while I have shown the preferred embodiment of my present invention, I do not wish to be limited to the exact details of construction shown and described, as obvious modifications thereof, not involving the exercise of the invention, may be made by any skilled mechanic, and such departures from what is herein set forth, I consider within the scope and terms of my claims.

I claim.

1. The combination of a relatively high-duty meter having a high-duty passage, a relatively low-duty meter having a low-duty passage, branches in which the two meters are respectively located, the inflow and outflow common to both, a high-duty valve to control the flow of water through the high-duty passage, a low-duty valve to control the flow of water through the low-duty passage, operative connections between the low-duty valve and the high-duty valve whereby the low-duty valve is closed when the high-duty valve is opened and vice versa, said connections comprising a toothed yoke pivotally connected to the high-duty valve and operatively connected to the low-duty valve, said toothed yoke provided with a rolling weight to assist in the opening and closing movements of both the low-duty and high-duty valves.

2. The combination of a relatively high-duty meter, a relatively low-duty meter, branches in which the two meters are respectively located, the inflow being common to both, and two mechanically connected valves, one controlling the flow through one branch and the high-duty meter, and the other controlling the flow through the other branch and the low-duty meter, the high-duty valve having two surfaces, a lower surface of small area to fit the interior of the valve seat and an upper surface of a large area which overlaps the valve seat and designed to be acted upon by the varying pressure differential to cause the flow to take place only through one or the other of said meters, and mechanism pivotally and slidably connecting said valves, said mechanism operated by varying pressure differential.

3. The combination of a relatively high-duty meter having a high-duty passage, a relatively low-duty meter having a low-duty passage, branches in which the two meters are respectively located, the inflow and outflow common to both, a high-duty lift valve to control the flow of water through the high-duty passage, a low-duty rotary valve to control the flow of water through the low-duty passage, operative connections between the low-duty valve and the high-duty valve whereby the low-duty valve is closed when the high-duty valve is opened and vice versa, the high-duty valve having two surfaces, a lower surface of small area to fit the interior of the valve seat and an upper surface of a much larger area which overlaps the valve seat and designed to be acted upon by the varying pressure differential.

4. The combination of a relatively high-duty meter having a high-duty passage, a relatively low-duty meter having a low-duty passage, branches in which the two meters are respectively located, the inflow and outflow common to both, a high-duty lift valve to control the flow of water through the high-duty passage, a low-duty rotary valve to control the flow of water through the low-duty passage, operative connections between the low-duty valve and the high-duty valve whereby the low-duty valve is closed when the high-duty valve is opened and vice versa, the high-duty valve having two surfaces, a lower surface of small area to fit the interior of the valve seat and an upper surface of a much larger area which overlaps the valve seat and designed to be acted upon by the varying pressure differential to cause the flow to take place only through one or the other of said meters, a toothed yoke pivotally connected to the high-duty valve and operatively connected to the low-duty valve, and a weight carried by said yoke to assist in the opening and closing movements of both the low-duty and the high-duty valves.

5. The combination of a relatively high-duty meter, a relatively low-duty meter, a common conduit having branches in which the two meters are respectively located, the inflow and outflow being common to both, and a valve provided with a lower small surface to fit the interior of the valve seat and an upper large surface which overlaps the valve seat, to abruptly close the high-duty branch against flow of pressure lower than a predetermined minimum and to open the same under a higher pressure, and a rotary valve carried by and operatively connected to said valve and moved therewith under higher pressure to close the low-duty branch.

6. The combination of a relatively high-duty meter, a relatively low-duty meter, branches in which the two meters are respectively located, the inflow and outflow being common to both, two pivotally connected valves, one having two surfaces of varying area, one surface to fit the interior of the valve seat and the other surface to overlap the valve seat, valve controlling the flow through one branch and the high-duty meter, and the other valve controlling the flow through the other branch and the low-duty meter, and mechanism connecting said valves, said mechanism being operated by varying pressure differential.

7. The combination of a relatively high-duty meter, a relatively low-duty meter, branches in which the two meters are respectively located, the inflow and outflow being common to both, two pivotally connected valves, one having two surfaces of varying area, one surface to fit the interior of the valve seat and the other surface to overlap the valve seat, valve controlling the flow through one branch and the high-duty meter, and the other valve controlling the flow through the other branch and the low-duty meter, and mechanism pivotally and slidably connecting said valves, said mechanism operated by varying pressure differential.

This specification signed and witnessed this 14th day of November, 1919.

ROBERT A. ANDERSON.

Witnesses:
FRED'K C. FISCHER,
J. A. BONNET.